June 9, 1953 K. R. LARSON 2,641,460
TORSION WEIGHING DEVICE
Filed Feb. 23, 1946 3 Sheets-Sheet 2
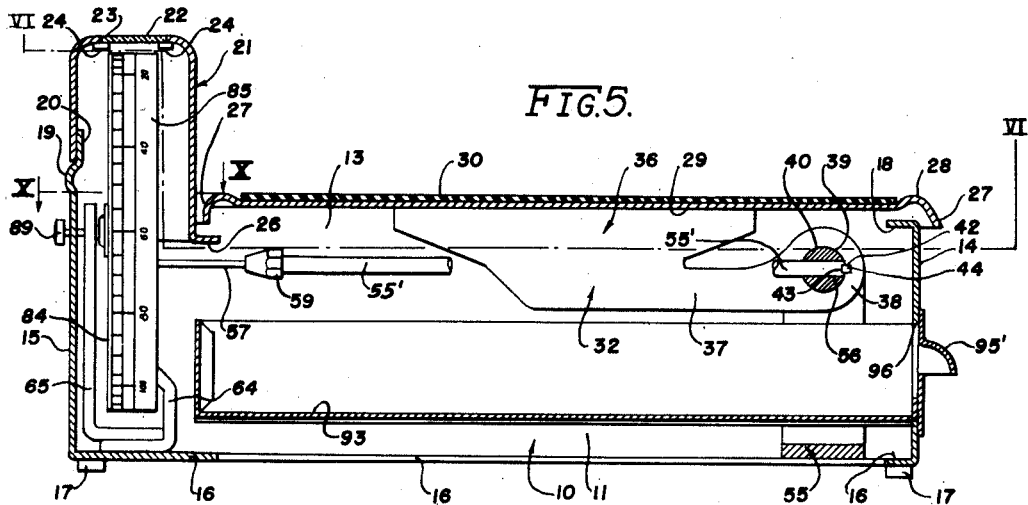
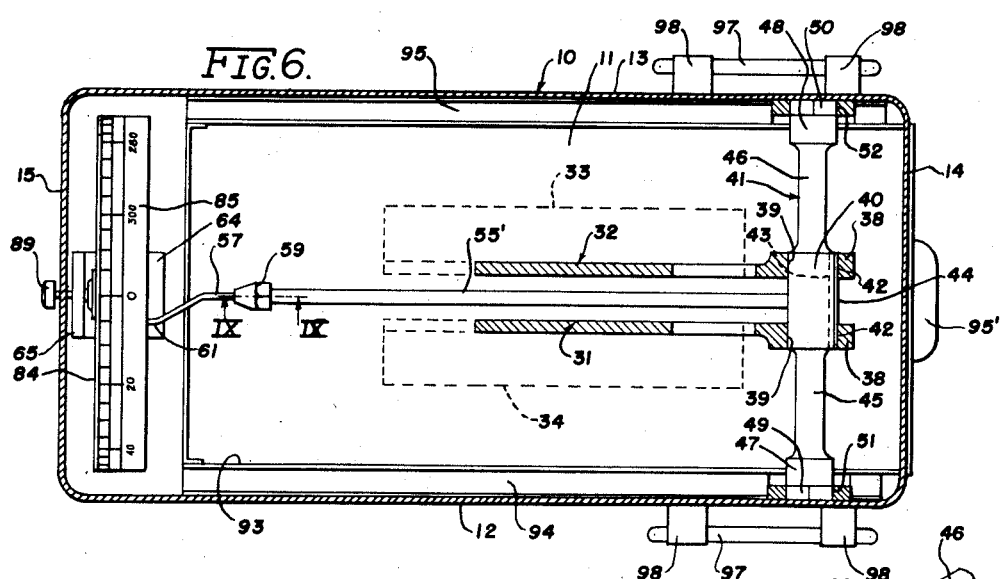
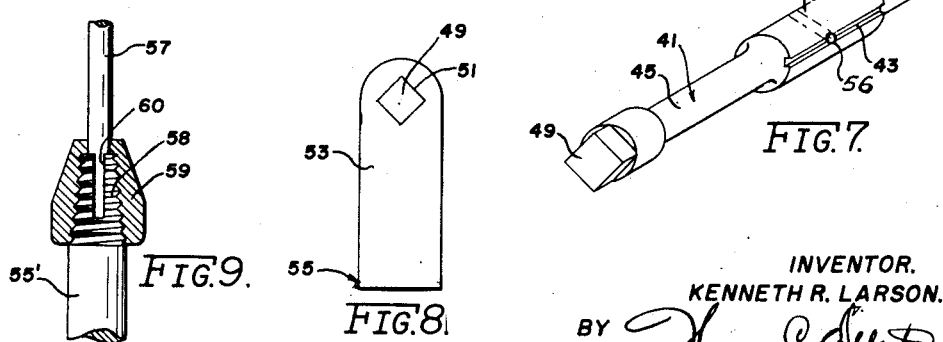
INVENTOR.
KENNETH R. LARSON.
BY
ATTORNEY.

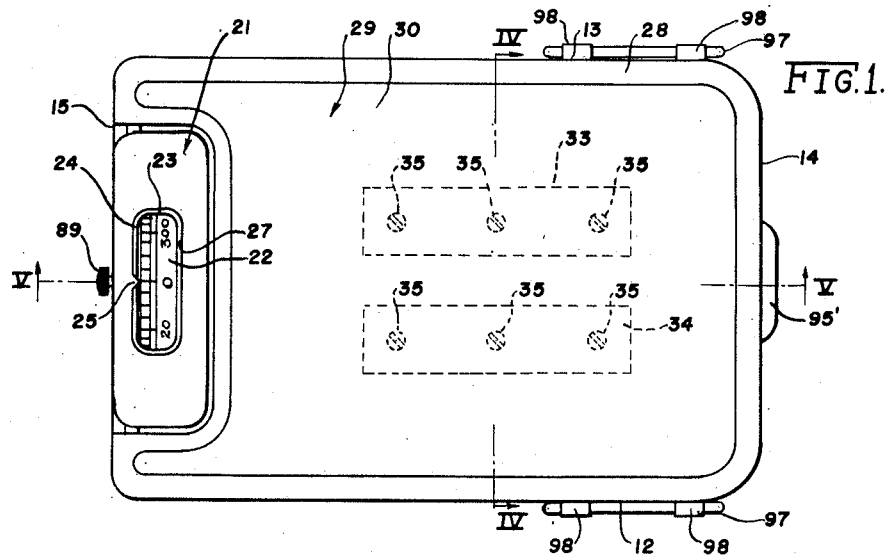
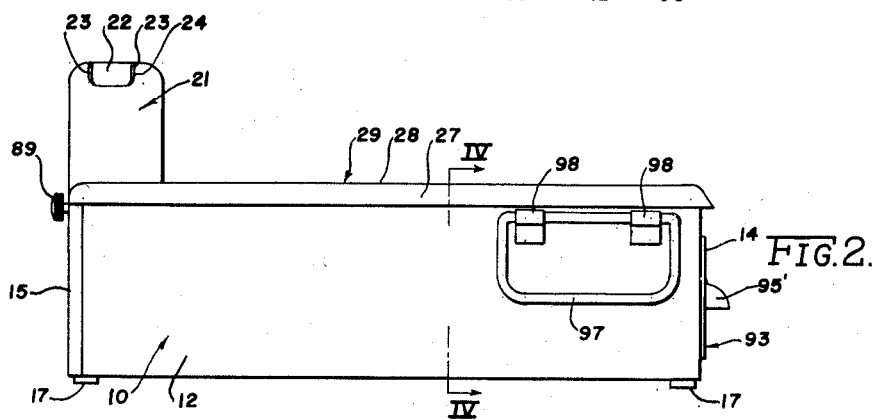
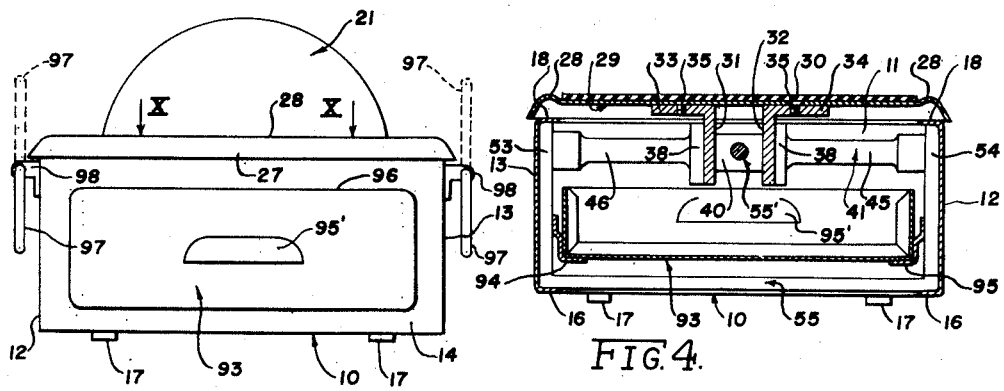

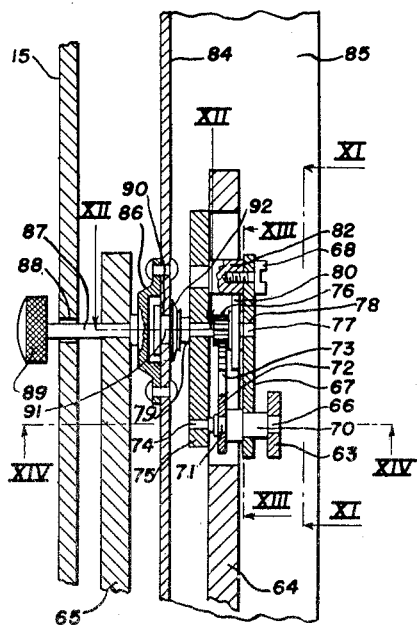
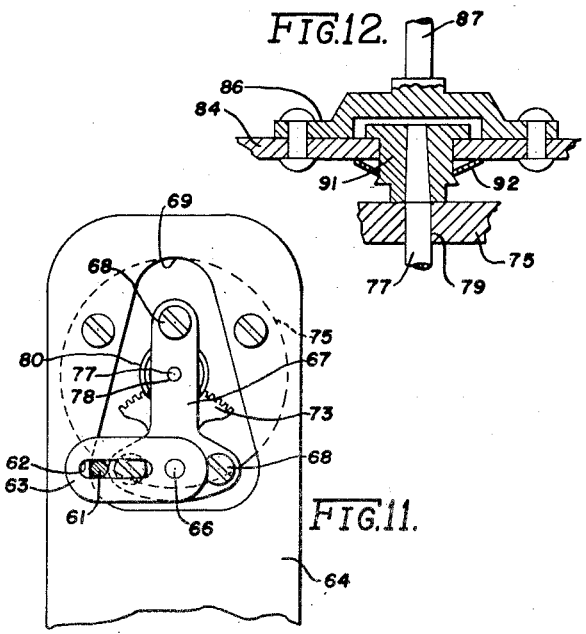
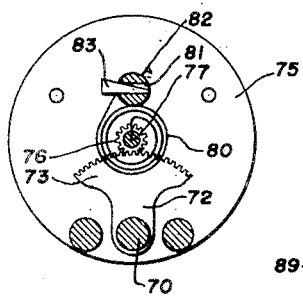
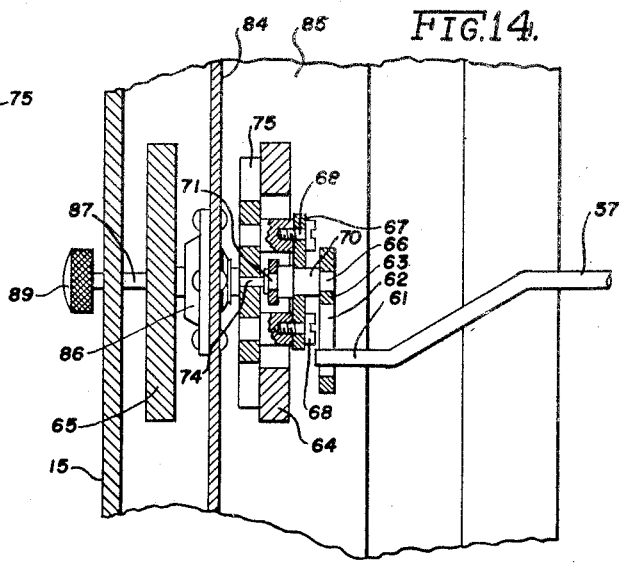

Patented June 9, 1953

2,641,460

UNITED STATES PATENT OFFICE 2,641,460

TORSION WEIGHING DEVICE

Kenneth R. Larson, Des Plaines, Ill.

Application February 23, 1946, Serial No. 649,485

3 Claims. (Cl. 265—68)

This invention relates to weighing devices and more particularly to weighing scales, although certain features thereof may be employed with equal advantage for other purposes.

It contemplates more especially the provision of simple, dependable, accurate and compact weighing instrumentalities involving no wear reacting elements which ordinarily contribute to inaccurate and varying functional operations.

Numerous types of weighing devices have heretofore been proposed, but these have not proven entirely satisfactory nor dependable owing to their numerous moving parts and wear reacting surfaces such as knife edges, fulcrums and balancers. This multitude of parts occupy substantial housing space beneath the supporting platform and, for the most part, do not function with sufficient accuracy to enable their use for commercial weighing purposes in the domestic weighing scale price field. There has been a long felt want for a weighing scale structure of the domestic class that is simple, compact, dependable, accurate, and instantly indicates the desired or registers any predetermined or pre-set weight sustained or to be applied to the platform thereof.

Then, too, great difficulty has been encountered in maintaining the weighing mechanism in good condition of operation due to the abuses occasioned both in handling and during the normal use thereof in weighing one's person. The applied weight is normally released rather abruptly at the instance of the user who steps from the supporting platform, and the recoil on the dial mechanism or other indicator is so rapid as to normally cause structural failures therein or at least abnormal wear and functional impairment. The present invention embodies no moving parts other than relative twist in an elongated body member subjected to the load for the weight determination thereof, and the indicator permits free slippage with reference to the dial mechanism actuator such as a rod extension which is preferably though not essentially highly flexible, resilient and possessed of only sufficient rigidity to overcome the load of displacing the indicating instrumentalities connected thereto. Consequently, the severe stress and strains resulting from any back-lash action occasioned when the load is quickly removed or released, will be absorbed for the most part by the flexing of the indicator actuator rod extension and thus protect the indicating instrumentalities under such normal conditions of rapid load release operations.

The compactness, simplicity, and comparatively few parts utilized in weighing devices embodying features of the present invention, not only promotes accuracy, durability, and inexpensive production, but also permits the housing or casing to be provided with a utility drawer for which there is a large variety of uses. Such a drawer could be advantageously used as a shoe shine kit with the weighing platform serving as a foot rest or pedestal for supporting the shoe to be shined without any impairment to the weighing instrumentalities irrespective of repeated impacts thereto during the shining operations. This is an important utilitarian feature in that shoe shining kits usually are inconveniently accommodated in the bathroom where they are most logically used. Consequently, a combination weighing scale and shoe shine kit of modern and attractive appearance will serve dual purposes and serve both effectively with minimum space requirements.

One object of the present invention is to simplify the construction and improve the operation of devices of the character mentioned.

Another object is to provide an improved weighing device which involves few parts and an indicator responding proportionately to stresses and strains in a calibrated fixed member subjected to varying loads to indicate the exact static weights thereof.

Still another object is to provide a weighing scale having torsion responsive indicator means in conjunction with a shock absorbing actuator for measuring the static weight occasioning the torsional stress.

A further object is to provide a weight measuring scale utilizing known torsional stress expedients as an indicator actuator for measuring static weights without involving any wear reacting parts other than the indicator mechanism.

A still further object is to provide improved weighing mechanism involving few parts and resorting to a stress-responsive fixed member through which static weight exerts a commensurate indicator reaction.

Still a further object is to provide accurate fixed stress responsive means for actuating a calibrated measuring indicator, commensurate with a supported static load.

An additional object is to provide a novel combination of stress indicating elements in association with a weighing scale casing to substantially reduce the number of parts and minimize the space requirements therefor to enable a utility drawer to be fitted therewith for use in conjunction with the casing platform.

Other objects and advantages will appear from the following illustrative embodiment of the present invention.

In the drawings:

Figure 1 is a plan view of a weighing scale embodying features of the present invention.

Figure 2 is a side view in elevation of the weighing scale shown in Figure 1 and embodying features of the present invention.

Figure 3 is a front view in elevation of the weighing scale shown in Figures 1 and 2, and embodying features of the present invention.

Figure 4 is a sectional view in elevation taken substantially along line IV—IV of Figures 1 and 2.

Figure 5 is a sectional view in elevation taken substantially along line V—V of Figure 1.

Figure 6 is a sectional plan view taken substantially along line VI—VI of Figure 5.

Figure 7 is a perspective view of the stress responsive fixed member serving as an indicator actuator to register the static weight load to which the fixed member is subjected.

Figure 8 is an edge or side view in elevation of the stress responsive fixed member support shown assembled in Figure 6.

Figure 9 is a fragmentary sectional view taken substantially along line IX—IX of Figure 6.

Figure 10 is a fragmentary enlarged sectional view of the dial mechanism taken substantially along line X—X of Figures 3 and 5.

Figure 11 is an enlarged sectional detail view taken substantially along line XI—XI of Figure 10.

Figure 12 is an enlarged sectional detail view taken substantially along line XII—XII of Figure 10.

Figure 13 is a sectional view in elevation taken substantially along line XIII—XIII of Figure 10.

Figure 14 is a fragmentary enlarged sectional view taken substantially along line XIV—XIV of Figure 10.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a substantially rectangular housing or casing 10 stamped, rolled, cast, or otherwise shaped from metallic material to present an elongated chambered interior 11 defined by confronting side walls 12—13 and end walls 14—15. The housing or casing 10 has its side and end walls terminating in a bottom inwardly directed peripheral flange 16 fitted with supporting feet 17 of rubber or other suitable material (Figure 5).

The upper ends of the housing walls 12—13 and 14 also terminate in an inwardly directed peripheral flange 18, but the rear end wall 15 extends upwardly therebeyond to present a horizontally extending bulge 19 which terminates in a vertical edge flange 20 (Figure 5) to frictionally receive and support, in this instance, an arcuate closure 21 for confining the indicator mechanism as will appear more fully hereinafter. The arcuate closure 21 has a transparent visor 22 fitted into an open top edge vision area 23 fitted with an overlapping bottom wall attached peripheral flange 24 for supporting the transparent visor 22 to view therethrough the indicator to be hereinafter described. The closure open vision area 23 is stamped or otherwise shaped to present an indicator pointer 25 (Figure 1) to present a reference point relative to which the indicator mechanism is calibrated.

The closure 21 has an out-turned bottom flange 26 (Figure 5) along the front and side edges to overlap beneath a down-curved peripheral flange 27 merging with an upwardly convex border bead 28 provided on a scale or weighing platform 29 (Figures 1 and 5). The beaded platform edge 28 and its depending flange 27 overhangs the housing top flange 18 and the indicator mechanism closure flange 26 to avoid any direct path of travel for water and foreign substances into the housing chamber 11 wherein the instrumentalities are mounted and confined as will presently appear. The upper surface of the platform 29 is preferably covered with a sheet 30 (Figure 4) of rubber or other suitable material that is adhered thereto within the confines of the platform bead 28.

The scale or weighing platform 29 floats relatively to the housing 10 and is supported, in this instance, by spaced parallel brackets 31—32 which have horizontal out-turned top flanges 33—34 for fixed attachment to the bottom of the scale platform 29 by means of suitable fastening expedients such as the fasteners 35. To this end, the brackets 31—32 have horizontally extended top attaching portions 36 to rigidly and non-yieldingly connect with the scale platform 29 which transmits the static weight load thereon to the bracket horizontal and forwardly extending shanks 37. The bracket shanks 37 terminate in enlarged circular bosses 38 (Figures 5 and 6) transversely bored as at 39 to tightly receive the enlarged diameter 40 of a torsion shaft 41 therethrough (Figure 7).

The bosses 38 preferably though not essentially are provided with keyways 42 therethrough as a complement of a keyway 43 provided along the enlarged torsion shank diameter or shoulder 40. A key 44 complemental to the keyways 42—43 fixedly attaches the scale or weighing platform supporting brackets 31—32 to the enlarged central shoulder 40 on the torsion shank 41. The torsion shank 41 has reduced diameter portions 45—46 adjacent both ends of the central torsion shank shoulder 40, and these merge in enlarged extremities 47—48 of the torsion shaft 41 which conforms in length with the interior width of the housing 10 to extend between the sides 12—13 thereof.

The torsion shaft 41 is anchored relative to the side walls 13—14 in any suitable manner as commercial practice may dictate. In this instance, the torsion shank extremities 47—48 are provided with polygonal ends 49—50 which register in complemental bores or sockets 51—52 provided proximate to the top ends of confronting upstanding arms 53—54 comprising part of a substantially U-shaped bracket member 55 that is complemental to the cross-section of the housing 10 for welded attachment to the interior thereof proximate to the front end 14 of the housing 10. This enables the torsion shaft 41 to be shaped from high quality heat treated alloy or spring steel without impairment thereto when fitting such into the housing 10 in any suitable manner such as described herein as one method of extremity anchored attachment of the torsion shaft 41.

The shaft 41 rigidly supports the scale or weighing platform 29 except when the reduced shank portions 45—46 yield due to torsional stress responsive to the static weight load on the scale or weighing platform 29. The platform 29 pivots for a very short swing proportional to the load and in direct ratio to the torsional stress or twist in the shaft 41 that is a factor of the weight load. When the load is removed from the platform 29, the shaft 41 will relieve itself of the twist or torsional stress therein to return to its initial position.

The extent of this torsion or twist or stress imparted to the end anchored shaft 41 responsive to the weight load on the platform 29, is measured by an elongated cylindrical indicator actuator or displacing rod 55'. The elongated rod 55' projects, in this instance, radially and diametrically through an aperture 56 in the center of the enlarged torsion shaft central shoulder 40 (Figure 5) for rotary movement therewith responsive to a torsional stress or twist imparted to the shaft 41. The elongated rod 55' extends rearwardly for substantially the length of the platform 29 to adjustably join therewith a smaller elongated actuator rod extension 57 for axial engagement with the free extremity of the actuator rod 55'. To this end, the free extremity of the actuator rod 55' terminates in a conical externally threaded and longitudinally slitted tubular extremity 58 for the reception of a correspondingly tapered and threaded nipple 59 thereover to vary the size of the axial bore 60 provided in the actuator rod extremity 58 (Figure 9).

The extension rod 57 projects within the bore 60 of the actuator rod extremity 58 for frictional engagement therein by means of the tightening nipple or nut 59 to effect the rigid connection of the rod extension 57 thereto which can be readily replaced should occasion demand or such become impaired through abuse in operation. It should be noted that the rod 55' together with its reduced rod extension 57 would function exactly the same even though these were turned or otherwise shaped from a single unit; however, such construction would be somewhat more expensive from a production standpoint than the pressed co-axial fitting relationship between the rods 55' and 57 serving as a floating actuator for the dial mechanism to be hereinafter described. With this arrangement the rod extension 57 may be extended or retracted within the axial bore 60 of the rod clutching extremity 58 to enable longitudinal and rotary adjustment thereof relative to the elongated rod 55' and the indicator mechanism to be hereinafter described. The rotary adjustment of the rod extension 57 will determine the initial adjustment and vary the extent to which the dial mechanism is actuated or displaced responsive to predetermined twists imparted to the shaft 41 that responds to the load on the platform 29. Consequently, this effects the extent of displacement of the indicator mechanism so adjustments can be made to insure accurate readings for any predetermined twist in the shaft 41.

The reduced rod extension 57 has a laterally offset extremity 61 (Figure 14) which projects rearwardly to constitute an angularly offset extremity for registry in a longitudinally elongated slot 62 provided in a lever 63 that is disposed in the chamber 11 proximate to the rear wall 15 of the housing 10 where the dial mechanism is supported on vertical parallel upstanding brackets 64–65 fixed to the housing flange 16 (Figure 5). The dial mounting brackets 64–65 overlap at their bottom for welded or other suitable attachment to the housing bottom flange 16 to support the dial instrumentalities which will be described more fully hereinafter. Normally any back-lash occasioned by the abrupt removal of the weight load may jar, impair and render permanently defective the measuring instrumentalities.

This can be largely overcome by the actuator rod extension 57 which is highly flexible, resilient and possessed of only sufficient rigidity to actuate the measuring instrumentalities connected thereto. Consequently, the severe stress and strains resulting from any back-lash action, will be absorbed for the most part by the flexing of the actuator rod extension 57 and thus protect the measuring instrumentalities in any type of beam device under such conditions of operation. Even though there is abrupt removal of load, therefore, the back-lash in the aforesaid structure would be negligible and the actuator rod 55'—57 would not be called upon to withstand any appreciable back-lash shock which could, however, be absorbed by the resilient rod extension 57 which is preferably constructed from small diameter spring steel wire. The steel spring wire 57 is sufficiently rigid to carry the comparatively small load involved in actuating the indicator instrumentalities without any flex therein and yet sufficiently resilient to absorb any shock created in the rapid or instantaneous removal of the weight load.

The dial weight indicating mechanism comprises the lever 63 which is fixed to a horizontal stub shaft 66 (Figure 14) journalled in a vertically disposed inverted T-shaped plate 67 attached by means of fasteners 68 to the upstanding bracket 64 which is apertured to provide an enlarged opening 69 therein to accommodate mechanism elements as will appear more fully infra. The shaft 66 has a concentric peripheral shoulder 70 terminating in the reduced portion 71 over which is pressed an apertured arm 72 of a gear segment 73 to abut against the shoulder 70. The shaft 66 terminates in a pin 74 which is journalled in a circular confronting plate 75 fixed to the bracket plate 64 on the side opposite the vertical and spaced inverted T-shaped plate 67 to confront each other for supporting indicator parts therebetween. The gear segment 73 meshes with a pinion 76 (Figure 13) mounted on a stub shaft 77 which is journalled in axial aligned bores 78—79 provided in the confronting inverted T-shaped and circular plates 67—75 mounted to the upstanding bracket 64 disposed therebetween.

A spiral spring 80 envelops the stub shaft 77 on which the pinion 76 is mounted or integrally formed, to normally urge or return the indicator instrumentalities to an initial position. It should be noted that one extremity of the spiral spring 80 is wedged in a transverse aperture 81 provided in a post 82 wherein a wedge 83 has been driven to establish the effective anchor thereof (Figure 13). A weight calibrated dial wheel 84 having a peripheral lateral circumferential rim 85, is axially riveted or otherwise attached to a dished disc hub plate 86 (Figure 14). The hub plate 86 is axially connected to a shaft 87 journalled in the upstanding bracket 65, to project through a guide aperture 88 in the rear end wall 15 of the housing 10 (Figure 10). A knurled knob 89 on the exterior accessible end of the shaft 87 provides for the presetting or resetting of the calibrated wheel 84—85 which rotates beneath the closure 21 in confronting relation to the pointer 25 thereon adjacent the visor 22.

It is to be noted that the dial wheel and peripheral flange 84—85 has an axial small aperture 90 therein to frictionally engage a grooved collar 91 having a convex friction disc 92 thereon and attached to the pinion supporting shaft 77 to frictionally retain the dial wheel 84 therebetween. Consequently, the dished friction disc or washer 92 assists in the journalled support of the dial wheel 84—85 which is frictionally retained to rotate with the aligned friction connected shafts 77—87 responsive to the operation of the pinion 76. This construction will also enable rotary displacement of the calibrated wheel 84—85 with the hub 86 that rotates in unison with or relative to the pinion shaft 77.

It will be apparent, therefore, that the calibrated dial wheel 84—85 will rotate with the hub plate collar 91 and the pinion shaft 77 whenever there is no obstruction in the path thereof or the shaft knob 89. However, any rotation of the presetting or resetting knob 89 will cause the calibrated dial wheel 84—85 to slip relative to the frictional clutch mount 91—92 (Figure 12) and its rigidly attached pinion operated shaft 77. This permits the calibrated dial wheel 84—85 to be turned to any predetermined initial position relative to the pointer 25 (Figure 1) for presetting to any desired reading or to its initial zero reading without any load on the platform 29, should there be any variation therefrom. Consequently, rotation of the dial wheel 84—85 relative to the friction clutch 91—92 will be possible only upon the direct application of manual turning force on the knob 89 and no rotary displacement will take place through accident without intentional adjustment. Other presetting or resetting expedients may be used, should commercial practice so dictate.

With the arrangements of parts above described, a very simple, dependable and accurate weighing scale has been incorporated into a housing 10 which has the large interior chamber 11 unoccupied for the most part so that it may be advantageously fitted with a horizontally sliding drawer 93. The drawer 93 is mounted on angle guides 94—95 (Figure 4) fixed to the interior side walls 11—12 of the housing 10, to horizontally move forward to open and rearward to close within the confines of the housing 10. The front wall of the drawer 93 is provided with a manual handle bracket 95' to manipulate the drawer 93. The front housing wall 14 is provided with an opening 96 to accommodate the front of the drawer front 93 which is complemental thereto (Figures 2 and 3). This provides convenient space for shoe shine equipment and supplies, with the platform top 29—30 serving as a shoe support.

So that a shoe shining cloth may be transversely reciprocated over a shoe tip surface, rectangular guide loops 97 are pivoted to lugs 98 fixed to the side walls 12—13 of the housing 10 immediately below the platform edge flange 27 (Figure 3). These shining cloth guide loops 97 normally swing downwardly to assume the full line position shown in Figure 3, but may be displaced upwardly (dotted line position shown in Figure 3) to accommodate the shining cloths therethrough so that the user may grasp the cloth ends and effect the reciprocatory displacement against the top surface of the shoe for imparting a luster thereto. The torsion shaft 41 will not yield under such use to any extent and even though any negligible twist is imparted therein, such will not affect the weighing instrumentalities or impair the accuracy or functions thereof.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a weighing scale, the combination with a housing, of a torsion resisting elongated member anchored at both extremities to said housing, spaced bracket arms anchored at one extremity to said torsion resisting elongated member to provide a support at the other extremity thereof free of said housing, a weight supporting platform member fixed to said last named bracket arm extremity to impart twist to said torsion resisting elongated member, a rod anchored at one extremity to said torsion resisting elongated member to extend between and parallel to said bracket arms, and calibrated indicating means in said housing in operative connection with the other extremity of said rod for displacement by said torsion resisting member to measure the twist thereof in terms of the weight supported on said platform.

2. In a weighing scale, the combination with a housing, of a torsion resisting elongated member anchored at both extremities to said housing, spaced bracket arms anchored at one extremity to and intermediate said torsion resisting elongated member to provide a support at the other extremity thereof free of said housing, a weight supporting platform member fixed to said last named bracket arm extremity to impart twist to said torsion resisting elongated member, a rod anchored at one extremity to said torsion resisting elongated member to extend between and parallel to said bracket arms, calibrated indicating means in said housing in operative connection with the other extremity of said rod for displacement by said torsion resisting member to measure the twist thereof in terms of the weight supported on said platform, and means for resetting said calibrated indicating means to an initial position relative to said torsional stress resisting member.

3. In a weighing scale, the combination with a housing, of a torsion resisting elongated member anchored at both extremities to said housing, spaced bracket arms anchored at one extremity to and intermediate said torsion resisting elongated member to provide a support at the other extremity thereof free of said housing, means between said torsion resisting elongated member and said spaced bracket arms to preclude any relative rotation therebetween, a weight supporting platform member fixed to said last named bracket arm extremity to impart twist to said torsion resisting elongated member, a rod anchored at one extremity to said torsion resisting elongated member to extend between and parallel to said bracket arms, calibrated indicating means in said housing in operative connection with the other extremity of said rod for displacement by said torsion resisting member to measure the twist thereof in terms of the weight supported on said platform, and means for resetting said calibrated indicating means to an initial position relative to said torsional stress resisting member, said resetting means including a friction indicator mount in said calibrated indicating means.

KENNETH R. LARSON.

(References on following page)

References Cited in the file of this patent

UNITED STATES PATENTS

| Number | Name | Date |
|---|---|---|
| 299,757 | Du Brul | June 3, 1884 |
| 340,010 | Springer | Apr. 13, 1886 |
| 363,873 | Witherell | May 31, 1887 |
| 1,159,416 | Powers | Nov. 9, 1915 |
| 1,397,518 | Hem | Nov. 22, 1921 |
| 1,407,987 | Crane | Feb. 28, 1922 |
| 1,610,197 | Brumser | Dec. 7, 1926 |
| 1,827,560 | Binckley | Oct. 13, 1931 |
| 2,124,968 | Ahrndt | July 26, 1938 |
| 2,352,906 | Lyons | July 4, 1944 |
| 2,458,481 | Ruge | Jan. 4, 1949 |

FOREIGN PATENTS

| Number | Country | Date |
|---|---|---|
| 156,517 | Germany | Nov. 21, 1904 |
| 195,229 | England | Mar. 29, 1923 |
| 786,861 | France | Sept. 11, 1935 |